United States Patent
Zhao et al.

(10) Patent No.: US 10,417,589 B2
(45) Date of Patent: Sep. 17, 2019

(54) PRE-SELECTION OF DRIVERS IN A PASSENGER TRANSPORT SYSTEM

(71) Applicant: Uber Technologies, Inc., San Francisco, CA (US)

(72) Inventors: Lei Zhao, Bellevue, WA (US); Feng Zhao, Kirkland, WA (US); Vincent Yates, Duvall, WA (US); Marc Pottier, Seattle, WA (US)

(73) Assignee: Uber Technologies, Inc., San Francisco, CA (US)

(*) Notice: Subject to any disclaimer, the term of this patent is extended or adjusted under 35 U.S.C. 154(b) by 0 days.

(21) Appl. No.: 15/365,715

(22) Filed: Nov. 30, 2016

(65) Prior Publication Data

US 2018/0121847 A1    May 3, 2018

Related U.S. Application Data

(60) Provisional application No. 62/415,845, filed on Nov. 1, 2016.

(51) Int. Cl.
*G06Q 10/06* (2012.01)
*G06Q 10/04* (2012.01)

(52) U.S. Cl.
CPC . *G06Q 10/06311* (2013.01); *G06Q 10/06312* (2013.01); *G06Q 10/06313* (2013.01); *G06Q 10/06314* (2013.01); *G06Q 10/06315* (2013.01); *G06Q 10/047* (2013.01)

(58) Field of Classification Search
CPC ....... G06Q 10/06311; G06Q 10/06312; G06Q 10/06313; G06Q 10/06314; G06Q 10/06315; G06Q 10/047
See application file for complete search history.

(56) References Cited

U.S. PATENT DOCUMENTS

| | | | |
|---|---|---|---|
| 9,483,744 B2* | 11/2016 | Lord | G06Q 50/30 |
| 9,697,503 B1* | 7/2017 | Penilla | G06Q 10/20 |
| 10,002,198 B2* | 6/2018 | Felt | G06Q 10/0631 |
| 2002/0065703 A1* | 5/2002 | Garg | G06Q 10/0631 |
| | | | 705/7.12 |

(Continued)

FOREIGN PATENT DOCUMENTS

| | | |
|---|---|---|
| CN | 103761585 A * | 4/2014 |
| JP | 2015-122108 A | 7/2015 |

(Continued)

OTHER PUBLICATIONS

Espacenet Machine Translation of Bibliography, CN 10376158.*

(Continued)

*Primary Examiner* — Tyler W Knox
(74) *Attorney, Agent, or Firm* — Fenwick & West LLP

(57) ABSTRACT

In some locations, such as airports, drivers that provide passenger transport must wait a significant distance away from the pickup location. To reduce the delay between a passenger requesting a ride and being picked up, drivers are pre-dispatched before being assigned to specific passengers. The demand for a future time period is predicted and the number of drivers that should be pre-dispatched to meet that demand is estimated. The estimated number of drivers is sent pre-dispatch instruction indicating they should leave the waiting area and head towards the pickup location.

19 Claims, 8 Drawing Sheets

(56) References Cited

U.S. PATENT DOCUMENTS

| | | | | |
|---|---|---|---|---|
| 2006/0235739 | A1* | 10/2006 | Levis | G06Q 10/08 705/1.1 |
| 2008/0228562 | A1* | 9/2008 | Smith | G06Q 10/08 705/13 |
| 2010/0299177 | A1* | 11/2010 | Buczkowski | G06Q 10/06 705/7.13 |
| 2011/0153629 | A1* | 6/2011 | Lehmann | G06Q 10/06 707/758 |
| 2011/0246404 | A1* | 10/2011 | Lehmann | G06Q 10/02 706/21 |
| 2011/0301985 | A1* | 12/2011 | Camp | G06Q 10/02 705/5 |
| 2012/0041675 | A1* | 2/2012 | Juliver | G06Q 10/08 701/465 |
| 2012/0253878 | A1* | 10/2012 | Forstall | G06Q 10/02 705/7.22 |
| 2013/0073327 | A1* | 3/2013 | Edelberg | G06Q 10/047 705/7.13 |
| 2013/0132140 | A1* | 5/2013 | Amin | G06Q 10/02 705/7.13 |
| 2013/0246301 | A1* | 9/2013 | Radhakrishnan | G06Q 30/0282 705/347 |
| 2015/0032491 | A1* | 1/2015 | Ulm, Sr. | G06Q 10/10 705/7.13 |
| 2015/0199697 | A1* | 7/2015 | Handley | G06Q 30/0202 705/7.31 |
| 2015/0204684 | A1* | 7/2015 | Rostamian | G01C 21/3438 701/537 |
| 2015/0339923 | A1* | 11/2015 | Konig | G08G 1/202 701/522 |
| 2016/0021154 | A1* | 1/2016 | Schoeffler | G06Q 10/10 709/204 |
| 2016/0104112 | A1* | 4/2016 | Gorlin | G06F 16/29 705/338 |
| 2016/0110659 | A1* | 4/2016 | Skeen | G06Q 10/02 705/5 |
| 2016/0180475 | A1* | 6/2016 | Phillips | G06Q 10/06311 705/7.13 |
| 2016/0247247 | A1* | 8/2016 | Scicluna | G06Q 10/02 |
| 2016/0335576 | A1* | 11/2016 | Peng | G06Q 10/06315 |
| 2016/0364669 | A1* | 12/2016 | Wang | G06Q 10/06315 |
| 2016/0364823 | A1* | 12/2016 | Cao | G06Q 50/30 |
| 2017/0046644 | A1* | 2/2017 | Zhang | G08G 1/202 |
| 2017/0132540 | A1* | 5/2017 | Haparnas | G06Q 10/06311 |
| 2017/0169377 | A1* | 6/2017 | Liu | G06Q 10/06315 |
| 2017/0192437 | A1* | 7/2017 | Bier | G05D 1/0038 |
| 2017/0193826 | A1* | 7/2017 | Marueli | G08G 1/202 |

FOREIGN PATENT DOCUMENTS

| | | | | |
|---|---|---|---|---|
| JP | 2015122108 A | * | 7/2015 | |
| KR | 10-1490363 B1 | | 2/2015 | |
| KR | 101490363 B1 | * | 2/2015 | |
| KR | 10-2016-0104301 A | | 9/2016 | |
| KR | 10-2016-0109713 A | | 9/2016 | |
| KR | 20160104301 A | * | 9/2016 | |
| KR | 20160109713 A | * | 9/2016 | G06Q 50/32 |

OTHER PUBLICATIONS

Espacenet Machine Translation of Bibliography, CN 103761585.*
Google Patents Machine Translation of Description and Claims, CN 103761585.*
Non-patent literature article, "An Assignment-Based Approach to Efficient Real-Time City-Scale Taxi Dispatching," by Michal Maciejewski, et al., Intelligent Transportation Systems, published by IEEE Computer Society, Jan./Feb. 2016.*
"An Assignment-Based Approach to Efficient REal-Time City-Scale Taxi Dispatching" by Michal Maciejewski,et al., Intelligent Transportation Systems, published by IEEE Jan./Feb. 2016.*
PCT International Search Report and Written Opinion, PCT Application No. PCT/IB2017/055975, dated Jan. 29, 2018, 12 pages.

* cited by examiner

PRE-SELECTION OF DRIVERS IN A PASSENGER TRANSPORT SYSTEM

BACKGROUND

1. Technical Field

The subject matter described relates generally to pre-selection and assignment of drivers in a passenger transportation system.

2. Background Information

Passenger transportation systems move people from a current location to a desired location. With the development of the Internet and almost universal availability of smartphones, tablets, and other web-enabled devices, new ways of arranging transportation have emerged. There are now several services that allow passengers to book transport on-line using an app or webpage. Increased Internet connectivity provides easier propagation of information between passengers, drivers, and dispatch services. The increase in connectivity has also simplified payment. While transport services historically required cash payment, many now provide for credit card and other forms of electronic payment directly at the point of service.

Such services can efficiently pair passengers and drivers in typical urban and suburban environments. However, in some locations, restrictions on drivers reduce efficiency. For example, many airports and other public buildings do not allow drivers to idle in front of the terminal or public building, or even to circle repeatedly through an access road. As a result, new solutions are required to promote efficiency in such areas.

DETAILED DESCRIPTION

The Figures and the following description describe certain embodiments by way of illustration only. Although the following figures are explained with reference to deployments at an airport, one of skill in the art will recognize that the principles are applicable in any scenario where there is a significant delay between drivers leaving a waiting area and arriving at a pickup location. One skilled in the art will readily recognize from the following description that alternative embodiments of the structures and methods may be employed without departing from the principles described. Wherever practicable, similar or like reference numbers are used in the figures to indicate similar or like functionality.

Figure 1:
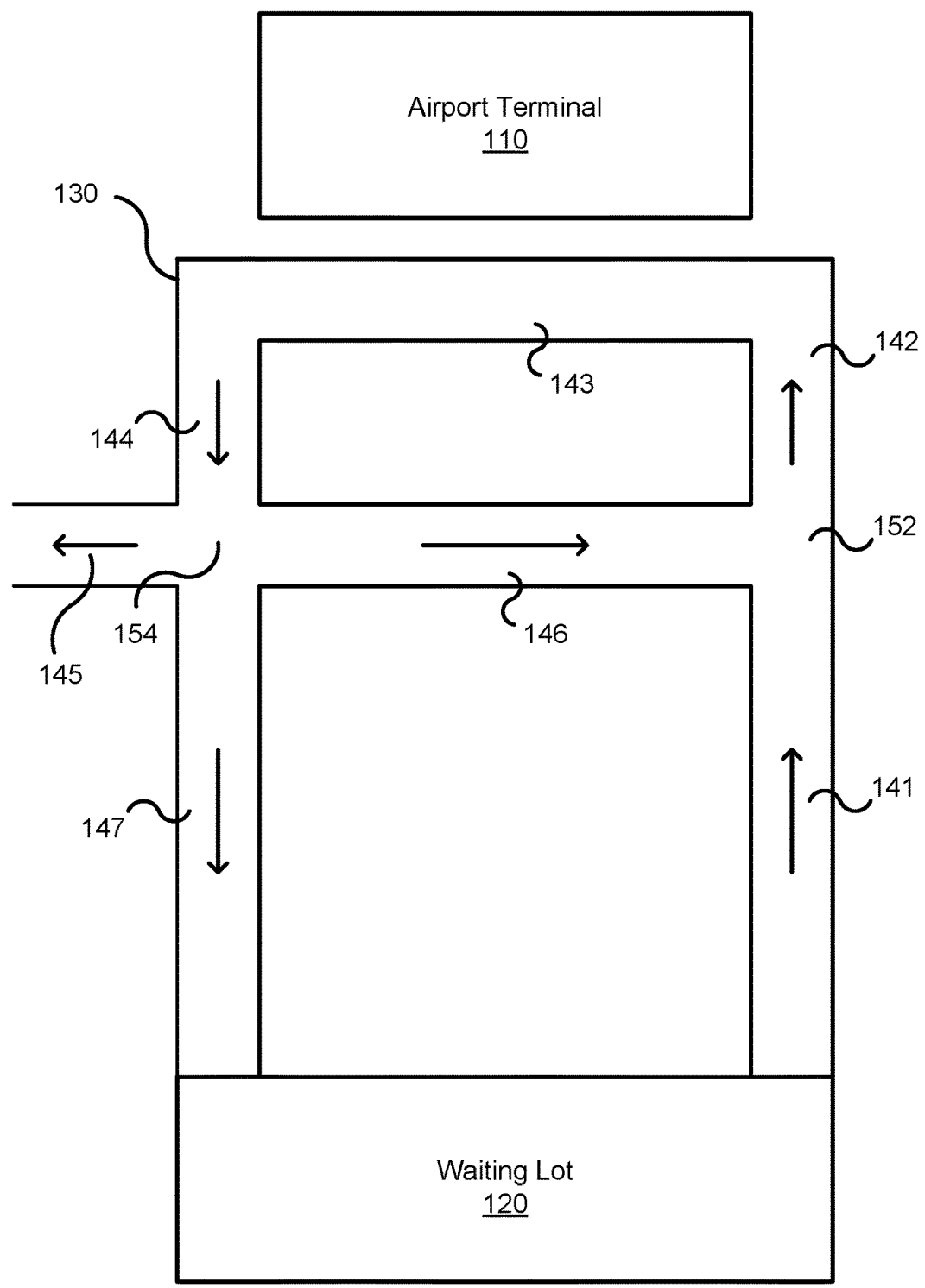
FIG. 1 is a conceptual diagram illustrating the relationship between a waiting lot and an airport terminal, according to one embodiment.

A passenger transport system provides services to drivers and passengers. The passengers request a ride (e.g., a transport service, or a trip) from a pickup location to a destination, and the drivers derive income from providing rides to passengers. A matching service pairs potential passengers with drivers, meeting both needs. In a typical city environment, the drivers distribute themselves throughout the city, and the matching service suggests passengers to them based on proximity. For example, in the simplest case, a passenger makes a request to the transport system and the transport system assigns an available or unassigned driver to provide the ride for that passenger. The assigned driver is selected from a pool of available drivers and may be, for example, one that has the shortest estimated time of arrival ("ETA") or is the closest to the passenger's location.

Where drivers are relatively free to roam while waiting to be paired with a passenger, such a system efficiently pairs passengers and drivers. However, in scenarios where drivers cannot idle near to likely pickup locations (e.g., at airports, certain public buildings, or other restrictive geographic locations or areas conditioned by transportation rules or regulations), this approach can result in an unacceptably long delay between a passenger requesting a ride and being picked up. In such scenarios, the drivers may be required to wait in a specific area, which can be a significant distance away from the terminal or public building. Consequently, even if a passenger is immediately paired with a driver, and the driver immediately leaves the waiting area, there is a delay caused by the time it takes the driver to reach the pick-up location. This delay reduces passenger satisfaction and may even result in the passenger giving up and selecting an alternate mode of transportation before the driver arrives. FIG. 1 illustrates such a scenario.

In the example of FIG. 1, potential passengers request rides near or while waiting at an airport terminal 110, and drivers may be required by airport rules to not wait at the airport terminal 110 or to continuously circle at the airport terminal 110. Alternatively, drivers may wait in a specified waiting lot or area 120 that is a distance (e.g., three miles or five miles) away from the airport terminal 110. Such a waiting lot or area 120 can be specified by a geographic region or geofence (e.g., defined by a set of location data points). Similarly, the airport terminal 110 (and/or its surrounding areas and/or roads) can be specified by a geographic region or geofence. Depending on implementation, the geofence for the waiting lot 120 may be separate from the geofence of the airport terminal 110 or may be included within the geofence of the airport terminal 110 (e.g., as a sub-region of the geographic region of the airport terminal 110).

The airport terminal 110 and waiting lot 120 are connected by a network of roads 130. The network of roads 130 shown in FIG. 1 is relatively simple for illustrative purposes. In reality, the roads in the network may not be straight, and multiple routes may be available between the waiting lot 120 and the terminal 110. In addition, in some examples, the airport might include multiple terminals 110 and/or multiple waiting lots 120.

In the example shown in FIG. 1, drivers leave the waiting lot 120 and traverse road segments 141 and 142 to reach the pickup area 143 outside the terminal 110. Ideally, drivers will always pick up one or more passengers in the pickup area 143. However, in some instances, this may not be possible. For example, if a user cancels a ride request at the last minute, there may be no one for the driver to pick up. As drivers are prohibited from waiting in the pickup area, they must exit via road segment 144 regardless of whether they have picked up passengers.

Assuming the driver picked up one or more passengers in the pickup area 143, the driver proceeds to intersection 144 and leaves the airport area on road 145. The driver can then take the passenger to the requested destination. If the driver did not pick a passenger, the driver could take road segment 146 to intersection 152 to reenter the pickup area 143 via road segment 142. However, airport rules often prohibit circling in this manner. Therefore, the driver may instead return to the waiting lot 120 via road segment 147.

If drivers are not pre-selected and instructed to leave the waiting lot 120 until a corresponding ride request is received, then the minimum ETA is the time it takes to traverse road segments 141 and 142. At many airports, for example, the typical ETA may be ten to fifteen minutes (depending on the location of the waiting lot 120 from the airport terminal 110), and can be even longer if the waiting lot 120 is an even greater distance away from the airport terminal 110. This time can also be extended due to time-specific events, such as crashes or construction work limiting the flow of traffic. Thus, the delay between a user requesting a ride and the driver arriving at the pickup area 143 can be fifteen minutes or more. However, in examples herein, by predicting the demand for rides at a given time or period of time in the future and by selecting a specified number of drivers to be pre-selected (e.g., instructed to leave the waiting lot 120 before being assigned a specific passenger), then the delay between a user requesting a ride and the driver arriving can be reduced, because the driver is already part-way to (e.g., traveling in the direction of) the pickup area 143 when the ride is requested. Thus, by predicting demand rather than waiting for explicit ride requests, the transport system that allocates drivers to passengers can operate more efficiently. Passengers are picked up sooner after making the initial ride request, which can reduce the amount of network traffic (e.g., if drivers arrive sooner, passengers will request updated ETAs less often).

Figure 2:
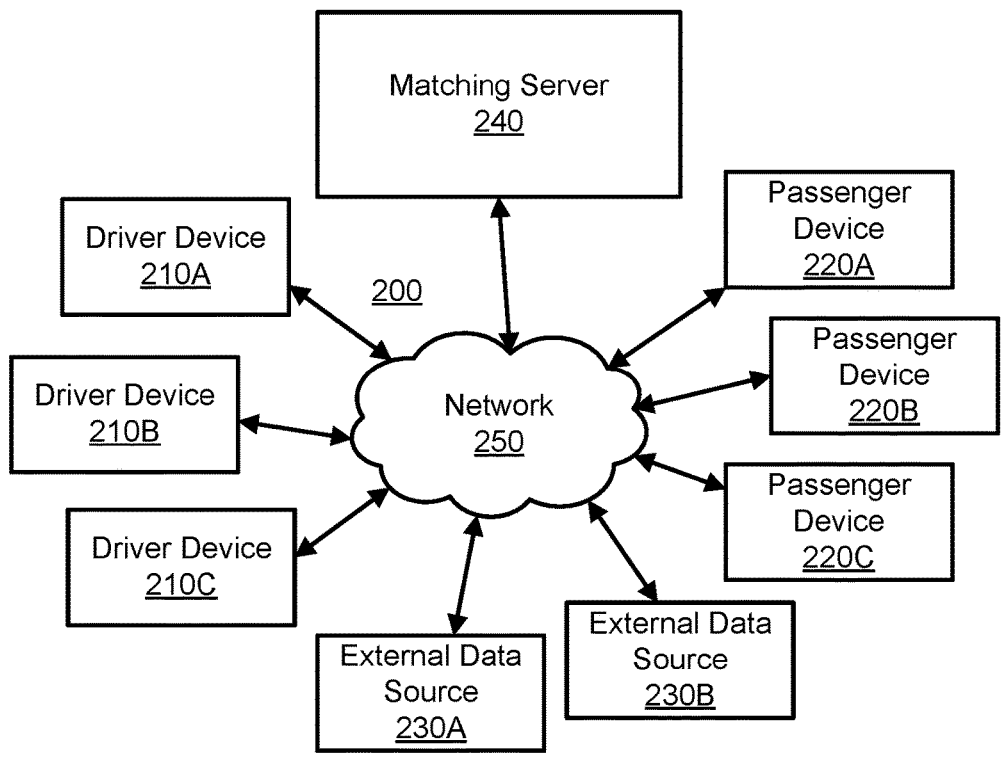
FIG. 2 is a high-level block diagram of a passenger transport system, according to one embodiment.

FIG. 2 shows one embodiment of a passenger transport system 200 for assigning potential passengers to drivers. In the embodiment shown, the passenger transport system 200 includes driver devices 210, passenger devices 220, external data sources 230, and a matching server 240 (e.g., that implements the network service for receiving trip requests and selecting drivers), all connected to a network 250. Although three driver devices 210 and passenger devices 220 are shown, in practical implementations, the passenger transport system typically includes many (e.g., hundreds or thousands of) each type of device. Similarly, while two external data sources 230 are shown, some implementations may include a greater or lesser number (including zero). In other embodiments, the passenger transport system 100 contains different or additional elements. In addition, the functions may be distributed among the elements in a different manner than described below.

A driver device 210 provides an interface between a driver and the rest of the passenger transport system 200. In one embodiment, the driver device 210 provides information about the driver (e.g., current location and availability) to the matching server 240 as well as issuing instructions (e.g., pre-selection instructions, allocation notices, and passenger information) to the driver. The driver device 210 can be a mobile device such as a smartphone located within the vehicle or be built into the vehicle (e.g., as part of an in-vehicle navigation system). Embodiments of the driver device 210 are described in greater detail below, with reference to FIG. 3.

A passenger device 220 provides an interface between a user/potential passenger and the rest of the passenger transport system 200. In one embodiment, the passenger device 220 provides information to the matching server 240 about the user (e.g., user identifier, mobile device identifier, etc.) and/or the request for transport service (e.g., current location, pickup location, and/or destination location) when the request is made by the user, as well as displaying information to the user about an assigned driver (e.g., name, type of car, and license plate number) and location information about the driver and/or estimated time of arrival information, when the driver is assigned to provide the transport service for the user. The passenger device 220 can be a mobile computing device, such as a smartphone, that executes and runs a dedicated application, but other types of computing device may be used. For example, a potential passenger might book a ride via a website using a booking terminal in an airport. Embodiments of the passenger device 220 are described in greater detail below, with reference to FIG. 4.

According to some examples, the external data sources 230 can provide information that the matching server 240 can use, in addition to other information, to allocate drivers to pick up specific passengers. In various embodiments, the external data sources 230 provide information including flight schedules, real time flight data (e.g., which flights are delayed and by how much), the number of people checked-in to flights, traffic data, weather forecasts, and the like. Although FIG. 2 shows the external data sources 230 connected directly to the network 250, some or all of the information may be provided via the driver devices 210 or passenger devices 220.

The matching server 240 receives ride requests from passenger devices 220 and sends instructions to driver devices 210 to fulfill the requests. In one embodiment, the matching server 240 predicts future demand for rides at a time or period of time in the future and sends a corresponding number of pre-selection instructions to driver devices 210 in a waiting lot 120. Such a pre-selection instruction can ask the driver to leave the waiting lot 120 and travel towards a specific location (e.g., the airport terminal) before the matching server 240 assigns that driver to provide a ride for a passenger. In some examples, the pre-selection instruction can also include content to inform the driver that the driver may subsequently be assigned a ride in a particular duration of time. Once a ride request is received from a passenger device 220, the matching server 240 assigns a driver (e.g., from among those already pre-selected and instructed to travel towards the specific location) and sends information about the passenger (e.g., name, pick-up location, and/or destination), as part of an invitation to the driver, to the corresponding driver device 210. In some examples, the driver can either accept or decline the invitation. As an alternative, in one example, if the driver that is selected is among those already pre-selected and instructed to travel towards the specific location, the driver can be automatically assigned to provide the ride for the passenger without the driver having to affirmatively accept an invitation. Embodiments of the matching server 240 are described in greater detail below, with reference to FIG. 5.

The network 250 provides a communication link between the other components of the passenger transport system 200. In one embodiment, the network 250 uses standard communications technologies and protocols, such as the Internet. Thus, the network 250 can include links using technologies such as Ethernet, 802.11, worldwide interoperability for microwave access (WiMAX), 2G/3G/4G mobile communications protocols, digital subscriber line (DSL), asynchronous transfer mode (ATM), INFINIBAND, PCI EXPRESS Advanced Switching, etc. Similarly, the networking protocols used on the network 250 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), etc. The data exchanged over the network 250 can be represented using technologies and formats including image data in binary form (e.g., Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In other embodiments, the entities in the network 250 use custom or dedicated data communication technologies instead of, or in addition to, the ones described above.

Figure 3:
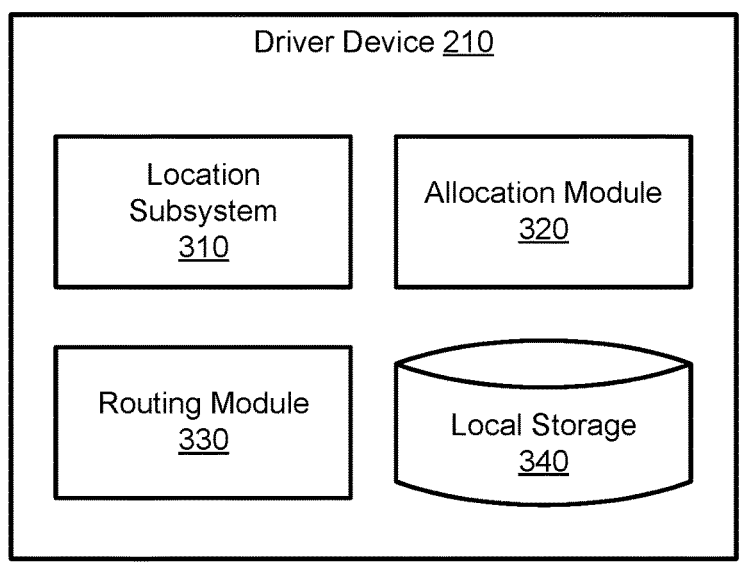
FIG. 3 is a high-level block diagram of a driver device suitable for use in the passenger transport system, according to one embodiment.

FIG. 3 illustrates one embodiment of a driver device 210. In the embodiment shown, the driver device 210 includes a location subsystem 310, an allocation module 320, a routing module 330, and local storage 340. Other embodiments of the driver device 210 include different or additional elements.

The location subsystem 310 determines the location of the driver device 210. In various embodiments, the location of the driver device 210 is determined using the global positioning system ("GPS"), cell-tower triangulation, Wi-Fi location, and the like. Some embodiments use a combination of these techniques. In one embodiment, the location subsystem 310 receives speed and direction information from the vehicle. The location subsystem 310 uses this information to assist in determining the vehicle's location. For example, if the vehicle enters a tunnel and loses GPS signal, the location subsystem 310 uses dead-reckoning to estimate the vehicle's location until the GPS signal is reestablished.

The allocation module 320 displays instructions and information to the driver regarding passengers. In one embodiment, the allocation module 320 presents two types of messages to the driver: pre-selection instructions and passenger allocations. A pre-selection instruction tells the driver to leave the waiting lot 110 and proceed towards the terminal 120 (or other designated pickup zone), but does not identify a particular passenger to pick up. In contrast, a passenger allocation identifies one or more specific passengers to pick up. For example, a passenger allocation could include the passenger's current location, destination, and identifying information (e.g., name, phone number, profile picture, and the like). In one embodiment, the ride allocation is presented as an offer to the driver, with the allocation being confirmed if the driver indicates acceptance of the ride offer (e.g., by selecting an "accept" button on a touchscreen of the driver device 210).

The routing module 330 provides directions to the driver regarding recommended routes between a current location and either a pickup location or a current passenger's destination. In one embodiment, the routing module 330 displays a map of the area around the vehicle and highlights a recommended route. The routing module 330 also provides written or verbal directions to the driver regarding how to follow the recommended route. In another embodiment, as well as identifying the recommended route, the routing module 330 also identifies one or more secondary routes. The routing module 330 also provides user controls to enable the driver to select one of the alternate routes. One of skill in the art will recognize various ways in which directions and route recommendations can be provided.

The local storage 340 includes one or more computer readable storage-media that store data used by the other components of the driver device 210. In one embodiment, the routing module 330 downloads map data for the vicinity surrounding the vehicle while the driver device 210 has a reliable connection to the network 250. This enables the routing module 330 to provide directions even when network connectivity is spotty or unavailable. In another embodiment, the local storage 340 stores a log of messages presented by the allocation module 320 so the driver can review them. For example, if the software providing allocation instructions is accidentally closed or crashes, the driver can recover the last instruction received from local storage 340.

Figure 4:
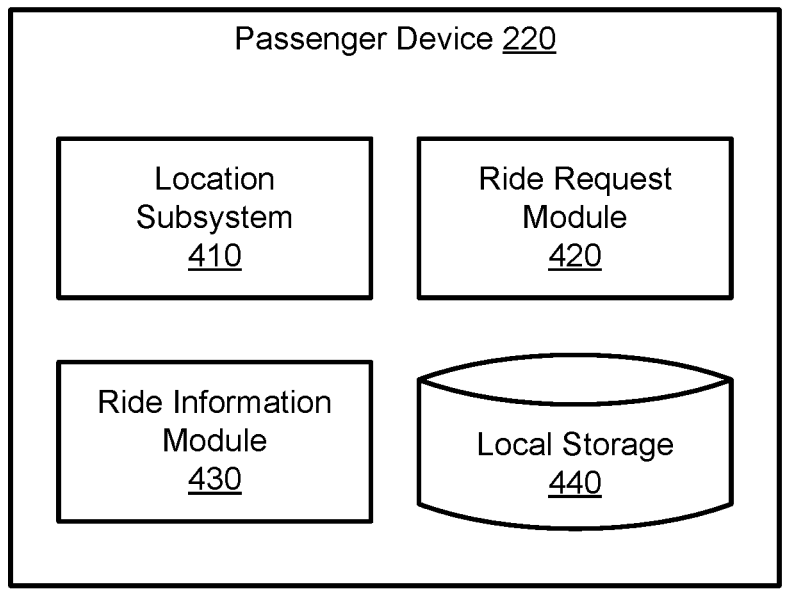
FIG. 4 is a high-level block diagram of a passenger device suitable for use in the passenger transport system, according to one embodiment.

FIG. 4 illustrates one embodiment of a passenger device 220. In the embodiment shown, the passenger device 220 includes a location subsystem 410, a ride request module 420, a ride information module 430, and local storage 440. Other embodiments of the passenger device 220 include different or additional elements.

The location subsystem 410 determines the location of the passenger device 220. In one embodiment, the location subsystem 410 of the passenger device uses GPS, cell-tower triangulation, or Wi-Fi location in a manner similar to the location subsystem 310 of a driver device 210. In another embodiment, the location subsystem 410 initially determines the passenger device's location using one or more of the above techniques and provides a user interface with which the user can specify a different location. In a further embodiment, the location subsystem 410 simply provides an interface for the user to manually enter a location.

The ride request module 420 provides an interface for the user to request a ride. In one embodiment, the user enters a destination and number of passengers into an on-screen interface. The ride request module 420 then generates a ride request including the user's location (as determined by the location subsystem 410), the number of passengers, the destination, and information about the user, such as name, phone number, profile picture, and the like. If the user has previously logged into the app, this information can be automatically inserted into the request from the user's profile. Alternatively, the ride request module 420 prompts the user to provide this information.

The ride information module 430 provides information to the user about the driver assigned to provide the requested ride. In one embodiment, this information includes the driver's name and profile picture as well as the make, model, color, and license plate number of the driver's vehicle. In another embodiment, the ride information module 430 also provides the driver's ETA at the pickup location and a map indicating the current location of the driver. In some embodiments, once the user has been picked up, the ride information module 430 provides current location and recommended route information so that the passenger can verify the driver is taking a reasonable route.

The local storage 440 includes one or more computer readable storage-media that store data used by the other components of the passenger device 220. In one embodiment, the user can save destinations to local storage 440 so these can be quickly recalled without entering the details (e.g., a street address). In another embodiment, such information is saved remotely (e.g., at the matching server 240).

Figure 5:
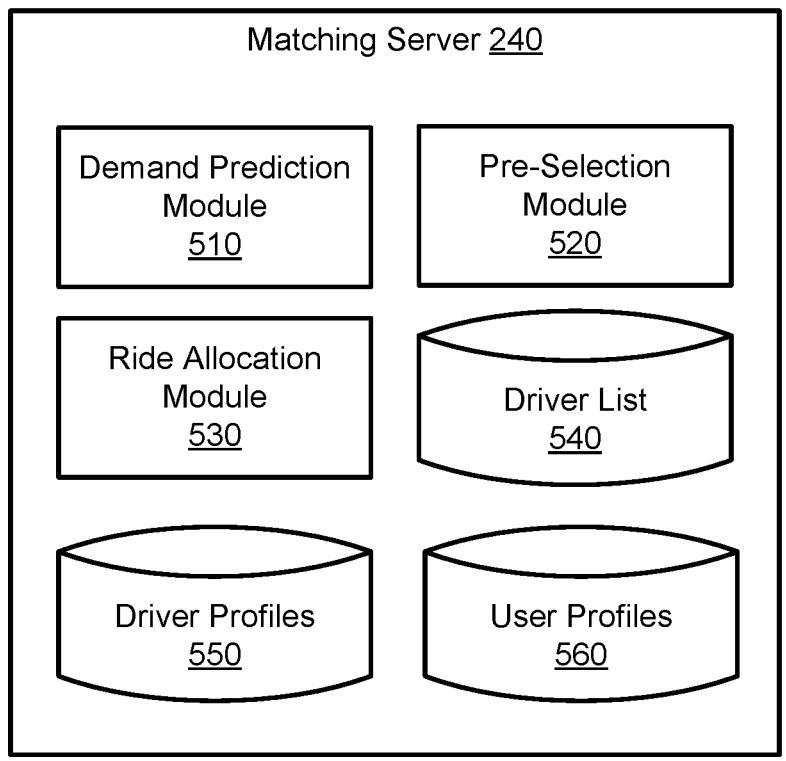
FIG. 5 is a high-level block diagram of a matching server suitable for use in the passenger transport system, according to one embodiment.

FIG. 5 illustrates one embodiment of a matching server 240. In the embodiment shown, the matching server 240 includes a demand prediction module 510, a pre-selection module 520, a ride allocation module 530, a driver list 540, driver profiles 550, and user profiles 560. Other embodiments of the matching server 240 include different or additional elements.

The demand prediction module 510 predicts future demand for rides at or in the vicinity of a pickup location. The demand prediction module 510 predicts the demand periodically, and the period may be defined in various embodiments at the discretion of the implementer, for example once a minute, once every five minutes, etc. Each prediction estimates the number of rides that will be requested in the next N minutes, where N is the typical number of minutes it takes to drive from the waiting lot 120 to the airport terminal 110. Alternatively, N is variable and set to the current predicted drive time to the airport terminal 110 (e.g., based on traffic data received from an external data source 230). In this way, the demand prediction can be tailored to the specific geographic layout and current conditions of the airport. One of skill in the art will recognize that other time windows may be used (e.g., a period in the range of three to five minutes that is set empirically to optimize performance for a given airport).

Regardless of the precise time window used, there are many sources of data that may be used to predict demand. In one embodiment, the demand prediction module 510 predicts demand based on historical demand in similar time periods. Time periods are considered similar if the statistical variation in demand for several such periods is below a threshold. For example, if the average demand on any weekday between 4:00 PM and 5:00 PM is three with a standard deviation of 0.1, all weekdays between those times might be considered similar. Conversely, if a statistical change in demand is noted between those times on a Friday relative to other weekdays, then Fridays would not be considered similar to other weekdays. Factors that can influence periodic demand for any given airport include: day, time, month, season, proximity to public holidays, other regular events (e.g., Superbowl weekend), etc. Non-periodic events can also influence demand. For example, if a transit service from the airport is shut down for scheduled maintenance, the demand prediction module 510 receives a notification in advance from an external data source 230 (e.g., a scheduled maintenance feed provided by the transit company via the Internet). The effect of that maintenance can then be estimated from previous periods where the transit service was unavailable. As another example, if the pickup location is near a sports stadium, the demand prediction module 510 might monitor a feed of the current score and time remaining in games at the stadium. The effect of different scores at different times in a game can then be correlated with demand (e.g., demand is low before the end of a tight game because everyone wants to stay, but higher if the game is a blow-out as many fans leave early to try and beat the rush).

Many other factors can be used to predict demand in addition to or instead of historical demand data. In various embodiments, the demand prediction module 510 receives flight data from an external data source 230. In one such embodiment, the flight data indicates planned arrivals at the airport, including the scheduled time of arrival, and size of plane. This flight data combined with historical data describing the percentage of seats typically filled on flights can be used to estimate the total number of people arriving at the airport at any given time. Thus, the demand can be estimated as a proportion of these individuals who will request a ride (e.g., based on historical data). In another embodiment, the flight data indicates the number of passengers checked in to each flight. Thus, the precise number of people arriving at the airport on flights can be determined, and the demand estimated. In yet another embodiment, the flight data includes the usernames of incoming airline passengers that are also users of the transportation system 200. The probability that any given user will request a ride at the airport can be included as part of a user profile (e.g., stored in the user profiles 560). Thus, the demand resulting from these existing users can be estimated by summing the probability that each will request a ride.

In one embodiment, the demand prediction module 510 employs a machine learning model to improve predictions of demand over time. After any given time period, the estimated demand for that period is compared to the actual demand (i.e., how many rides were actually requested). The difference between the predicted and actual demand is an error margin that is fed back into the model. If the predicted demand is less than the actual demand, the model is adjusted such that future predictions of demand for similar time periods are larger. Conversely, if the predicted demand exceeded the actual demand, future predictions will be lower. Thus, the model is improved over time to more accurately predict the true demand. The model can also respond dynamically to changes in demand pattern.

One of skill in the art will recognize many other data inputs that can be used to estimate demand. For example, a demand model might consider one or more of the following: recent instances of users opening the ride request app, user calendars (e.g., entries indicating a user will be flying to a particular airport), users' location data, the typical time it takes a user to get from the gate to the pickup point at an airport, recent instances of users turning their phones on (indicating they just landed), the city of origin (users from some cities are more likely to request rides than others), etc.

The pre-selection module 520 issues pre-selection instructions to driver devices 210 based on the predicted demand. In various embodiments, the pre-selection module 520 receives the predicted demand for the next period from the demand prediction module 510. The pre-selection module 520 then accounts for drivers that were previously pre-selected and are still available to pick up passengers to estimate the unmet demand. The pre-selection module 520 then determines how many additional pre-selection instructions are likely to be needed to meet the unmet demand and issues pre-selection instructions to that number of driver devices 210.

In one embodiment, previously pre-selected drivers are accounted for by determining which are en route to the terminal 110. Based on position data received from the corresponding driver device's location subsystem 310 (e.g., GPS data), the pre-selection module 520 can determine whether the driver has responded to the earlier pre-selection instruction. For example, if the driver device 210 has moved more than a threshold amount, this is interpreted as accepting the pre-selection instruction. Alternatively, a driver is only considered to be pre-selected if the corresponding driver device 210 has left the waiting lot 120 and is on a road that is part of a reasonable route to the terminal 110. Of the drivers that responded to a previous pre-selection instruction, those who have already been assigned to one or more passengers are discounted. Thus, the pre-selection module 520 can determine the number of drivers currently en route to the terminal 110 who are available to be assigned passengers, and subtracts this number from the predicted demand to produce an estimate of the unmet demand. In another embodiment, the drivers alternately or additionally indicate they are en route manually using their driver device 220.

In one embodiment, the pre-selection module 520 determines how many pre-selection instructions to issue by multiplying the estimated unmet demand by a probability that drivers will respond to the pre-selection instruction during the corresponding period. This probability can be pre-set as a parameter or determined on a rolling basis as an average of the proportion of drivers that respond to pre-selection instructions (either globally or at the specific airport). In another embodiment, each driver has an individual probability of responding to a pre-selection instruction (e.g., stored in the driver profiles 550). This probability can be determined using a model based on similar drivers (e.g., those at the same or a similar airport, of a similar experience level, with similar schedules, and the like), based on how often the driver responded to pre-selection instructions previously, or using a combination of both approaches. The number of pre-selection instructions to issue is then determined by stepping through drivers (e.g., as stored in the driver list 540) and summing the probability of each driver responding until the sum exceeds the estimated unmet demand.

In a related embodiment, the pre-selection module 520 also considers the average time that each driver normally takes to respond to a pre-selection instruction. For example, if a driver responds to pre-selection instructions 95% of the time but typically takes ten minutes to do so, and that driver received a pre-selection instruction eight minutes earlier but is still in the waiting lot 110, the pre-selection module 520 might consider that driver to be 90% likely to leave the waiting lot to head to the terminal 520 in the next period. Alternatively, the pre-selection module 520 uses an aggregate value for how long drivers take to respond to a pre-selection instruction. This aggregate value might be set as a parameter or determined as an average of response times for drivers with some level of granularity (e.g., all drivers worldwide, all drivers in a country, all drivers at that airport, etc.). One of skill in the art will recognize various ways in which the probability of a driver responding to a pre-selection instruction in the next period can be estimated.

The ride allocation module 530 assigns drivers to specific passengers. In one embodiment, on receiving a ride request from a passenger device 220, the ride allocation module 530 identifies all drivers that have received a pre-selection instruction that have yet to be assigned one or more passengers. The current location of the corresponding driver devices 210 is then checked to confirm that the driver has not returned to the waiting lot 120 or left the area (e.g., is outside of a pre-defined area that encompasses reasonable routes to the terminal 110). After removing these drivers, the ride allocation module 530 assigns the driver with the shortest ETA to the pickup location, sending information about the passenger (or passengers) to the corresponding driver device 210. In another embodiment, the ride allocation module 530 also includes drivers that have not been pre-selected but are within the vicinity of the terminal (e.g., those that have just dropped off a passenger at the airport or just happen to be nearby). However, drivers that have received pre-selection instructions are favored over those that have not (e.g., by shortening their ETA by a certain amount before assigning the driver with the shortest ETA).

The driver list 540, driver profiles 550, and user profiles 560 are stored in one or more computer readable media. Although these are shown in separate components in FIG. 5, in some embodiments, a single computer readable medium (e.g., a hard drive) is used to store two or more of these types of data. In addition, in some embodiments, one or more types of the data are stored across multiple computer readable media. For example, the user profiles 560 might be stored in a distributed database.

The driver list 540 is a list of driver IDs in a waiting status (e.g., in the waiting lot 110) including an indication of an order that the corresponding drivers should be considered for pre-selection. In one embodiment, the driver list 540 is a first in, first out ("FIFO") list indicating the order that the drivers were added to the list (e.g., as indicated by location data from the corresponding driver device's location subsystem 310). This order can be implicit (e.g., the order of the driver IDs in the list) or explicit (e.g., a numerical identifier or time code stored in association with each driver ID). In other embodiments, other methods are used to order the drivers in the list 540, such as seniority, cancellation rate, feedback scores, and the like.

In some embodiments, drivers that leave the waiting lot 110 are initially marked as provisionally removed in the driver list 540. If the driver gets to the terminal 120 without being assigned a passenger and then returns to the waiting lot 110, the provisional removal is cancelled. Thus, the driver does not lose his or her spot in the driver list 540 by following a pre-selection instruction that does not result in a passenger assignment. However, if the driver leaves a pre-determined area around the airport entirely (e.g., as indicated by a geofence), the corresponding driver ID is removed from the driver list 540.

The driver profiles 550 include information about drivers. In one embodiment, a driver's profile includes a driver ID, an identifier of the driver's driver device 210, the driver's name, a photograph of the driver, the driver's vehicle type and license plate number, an average passenger rating of the driver, a probability that the driver will respond to a pre-selection instruction, and an average time that it takes the driver to respond to a pre-selection instruction. In other embodiments, a driver profile includes different or additional information.

The user profiles 560 include information about users (potential passengers). In one embodiment, a user's profile includes the user's name, a photograph of the user, the user's home city, one or more common destinations, an indication of how likely the user is to request a ride when located at an airport, and links to one or more additional sources of information about the user (e.g., a link to the user's calendar stored at an external data source 230 to which the user has granted the matching server 240 permission to access). In other embodiments, a user profile includes different or additional information.

Figure 6:
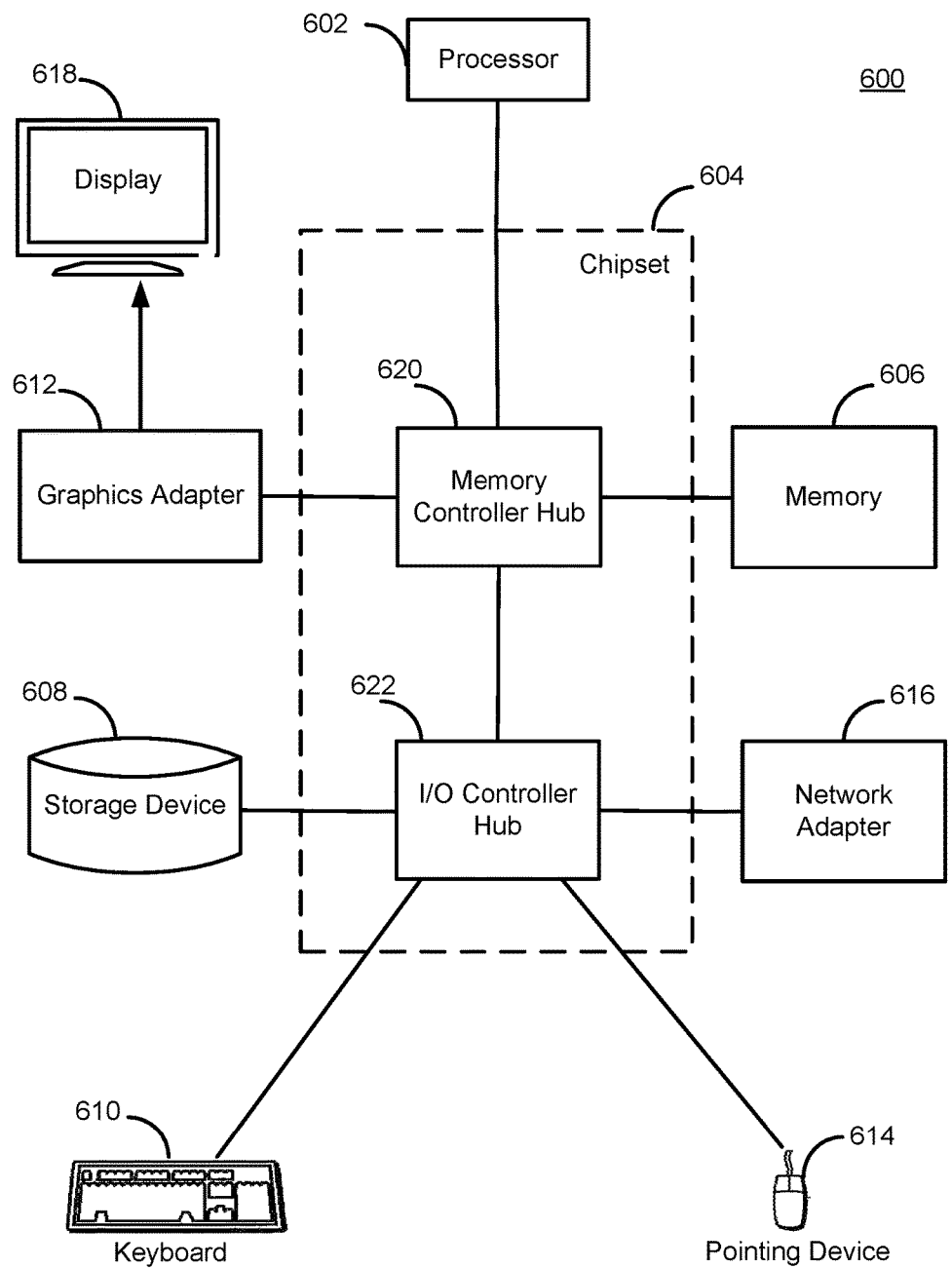
FIG. 6 is a high-level block diagram illustrating a computer suitable for use in the passenger transport system, according to one embodiment.

FIG. 6 is a high-level block diagram illustrating an example computer 600 suitable for use as a driver device 210, passenger device 220, or matching server 240. The example computer 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. For some devices (e.g., a mobile device used as a passenger device 220), the keyboard 610 is an on-screen keyboard and the pointing device 614 is a touch-screen. Other embodiments of the computer 700 have different architectures.

In the embodiment shown in FIG. 6, the storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, touch-screen, or other type of pointing device, and is used in combination with the keyboard 610 to input data into the computer system 600. The graphics adapter 612 displays images and other information on the display 618. The network adapter 616 couples the computer system 600 to one or more computer networks, such as network 250.

The types of computers used by the entities of FIGS. 2 through 5 can vary depending upon the embodiment and the processing power required by the entity. For example, the matching server 240 might be multiple blade servers working together to provide the described functionality described. In contrast, a driver device 210 and passenger device 120 might be a smartphone running an app that provides the described functionality. Furthermore, the computers 600 can lack some of the components described above. For example, the matching server 240 might lack a keyboard 710, graphics adapter 712, or display 718.

Figure 7:
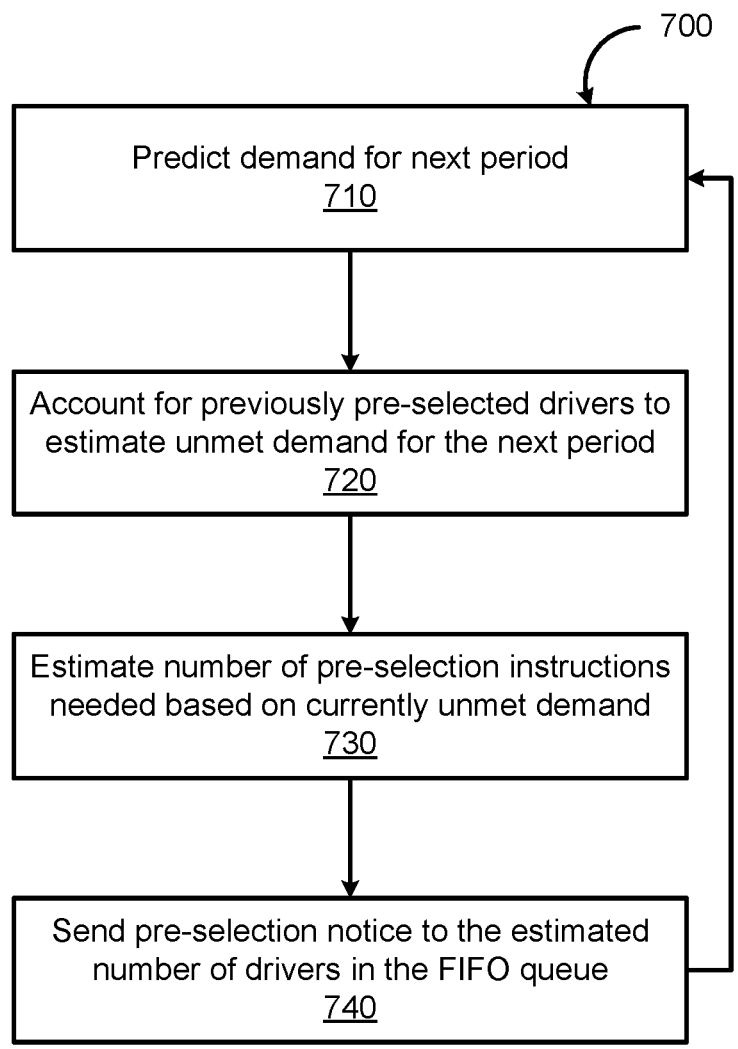
FIG. 7 is a flow-chart illustrating a method for pre-selecting drivers, according to one embodiment.
Figure 8:
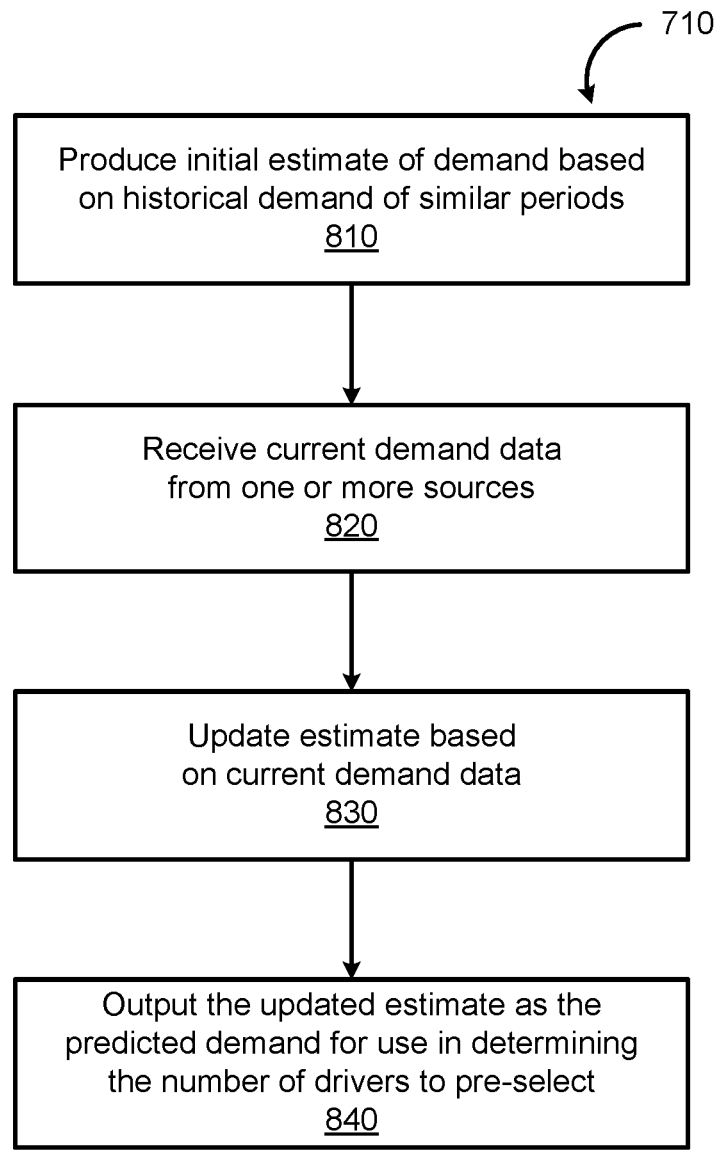
FIG. 8 is a flow-chart illustrating a method for predicting the demand for rides, according to one embodiment.
Figure 9:
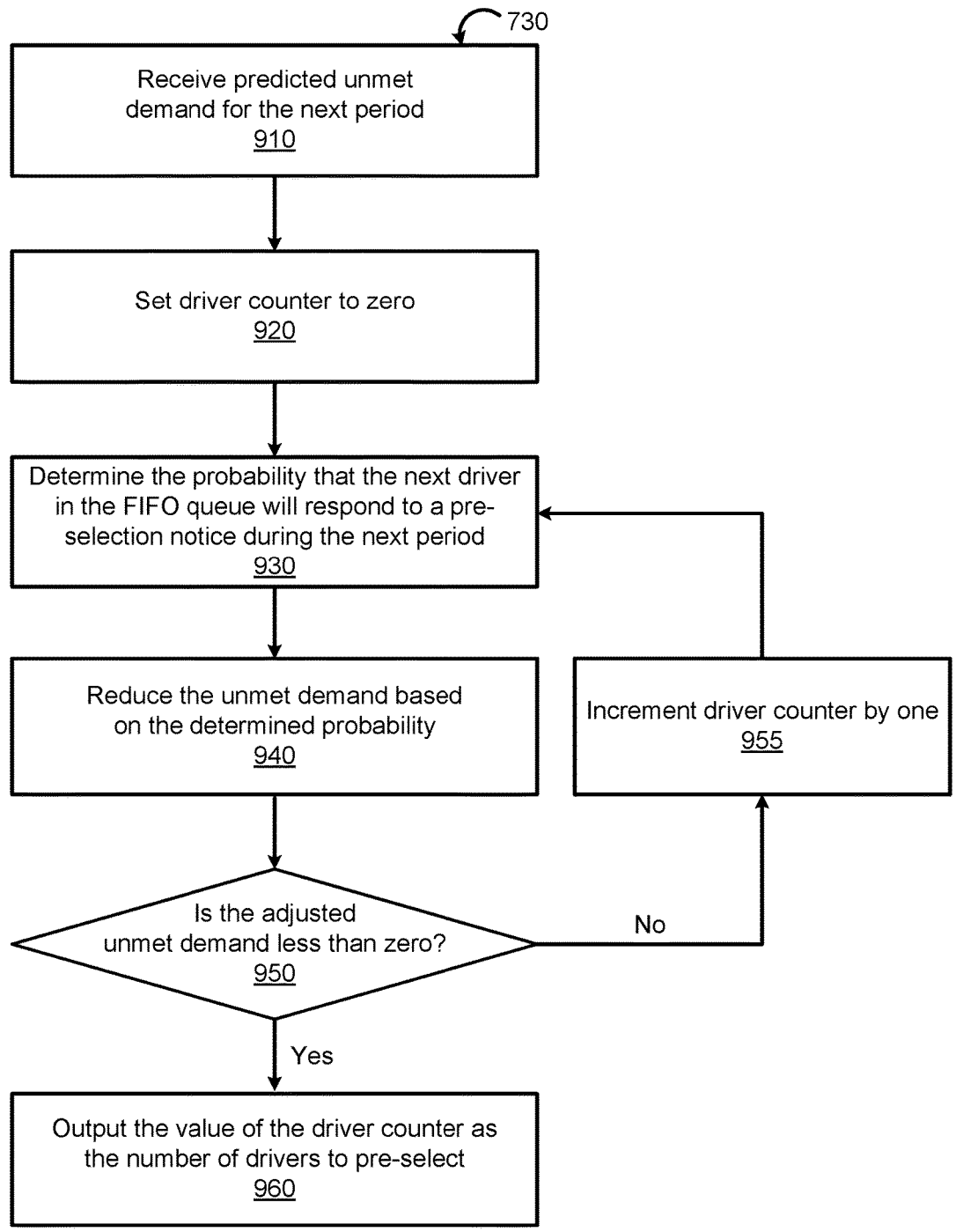
FIG. 9 is a flow-chart illustrating a method for determining the number of drivers to pre-select from a waiting lot to meet the predicted demand, according to one embodiment.
Figure 10:
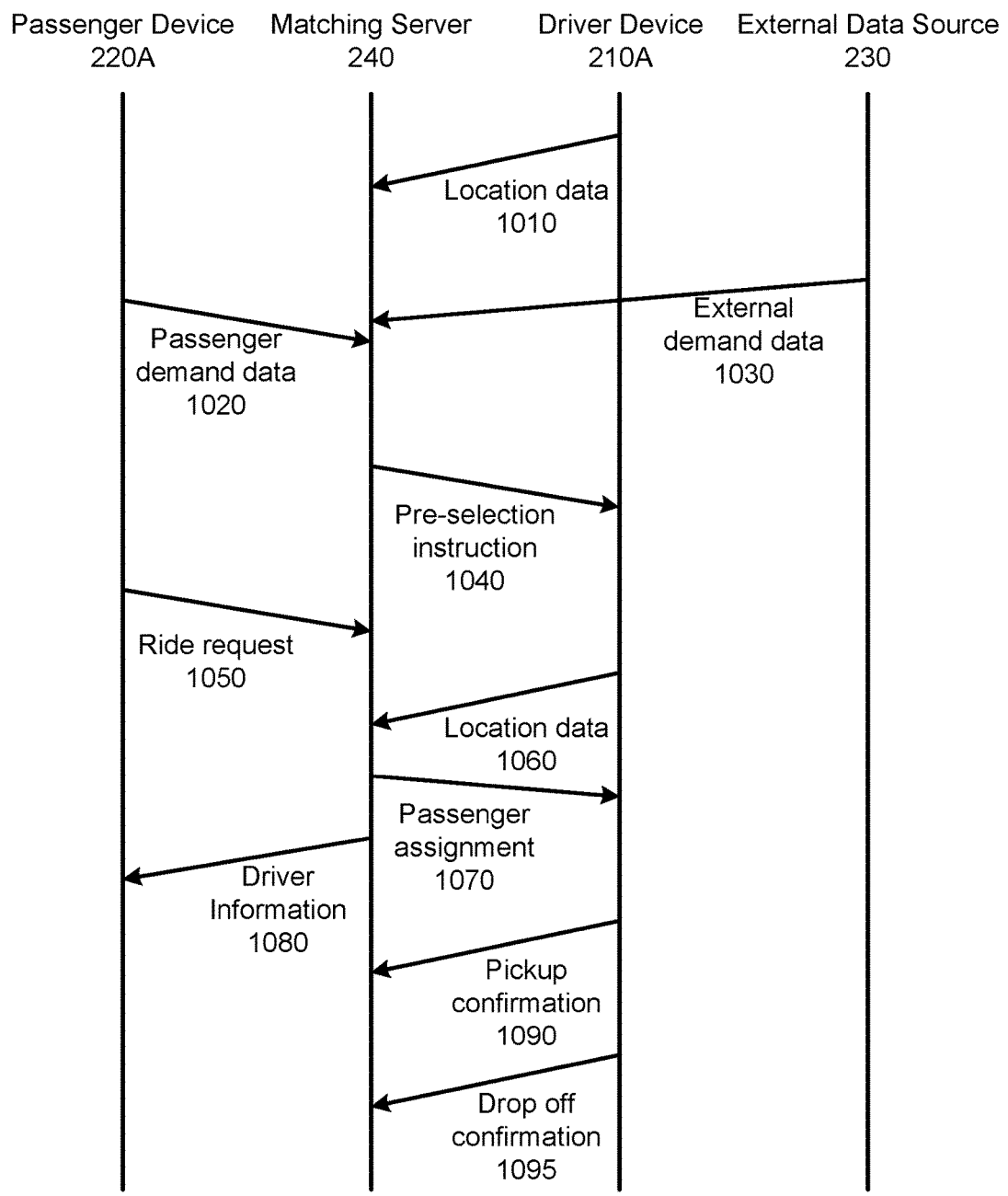
FIG. 10 is an interactions diagram illustrating an example use case in which a passenger requests a ride, which is provided by a previously pre-selected driver, according to one embodiment.

FIGS. 7 through 9 illustrate example methods of arranging transport services in a given geographic region. The steps of FIGS. 7-9 are illustrated from the perspective of the matching server 240 performing the methods. Similarly, FIG. 10 illustrates various entities performing various functions. However, some or all of the steps may be performed by other entities or components. In addition, some embodiments may perform the steps in parallel, perform the steps in different orders, or perform different steps. For example, although FIG. 10 shows passenger demand data 1020 arriving at the matching server 240 after external demand data 1030, these data may be received simultaneously or in the opposite order.

FIG. 7 illustrates a method 700 for pre-selecting drivers, according to one embodiment. In the embodiment shown in FIG. 7, the method 700 begins with the demand prediction module 510 predicting 710 the demand for the next time period. The predicted demand is an estimate of the number of rides that will be requested in the next time period. As described previously, the estimate is based on one or more of: historical demand for similar time periods, flight data, recent instances of a user opening a ride request app, user calendars, user location data, the typical time it takes a user to get from the gate to the pickup point at an airport, recent instances of users turning on phones, and the like. An example method for predicting 710 demand is discussed below, with reference to FIG. 8.

Referring again to FIG. 7, the pre-selection module 520 accounts 720 for drivers that were already pre-selected and are still available to meet demand. In one embodiment, the pre-selection module 520 uses driver location data to determine the number of pre-selected drivers that are en route to the terminal. Drivers en route who have already been assigned one or more passengers are subtracted, to determine the number of already pre-selected drivers available to meet demand. This number is then subtracted from the predicted total demand to produce a prediction of the unmet demand.

The pre-selection module 520 estimates 730 the number of drivers to pre-select based on the predicted unmet demand. In one such embodiment, the number is equal to the predicted unmet demand. In another embodiment, the number is estimated 730 by multiplying the unmet demand by a proportion of drivers that are expected to respond to a pre-selection instruction within the time period. The proportion can be set as a parameter or determined dynamically as a rolling average of the proportion of drivers that did respond in previous time periods. In a further embodiment, the number is estimated 730 by considering the probability that each individual driver in the FIFO list 540 will respond to a pre-selection instruction within the time period, based on the corresponding driver profile 550 (as described above, with reference to FIG. 5). An example implementation of this embodiment is described below, with reference to FIG. 9.

Referring again to FIG. 7, regardless of how the number of drivers to pre-select is determined, the pre-selection module 520 sends 740 pre-selection instructions to that number of driver devices 210. In one embodiment, the pre-selection module 520 sends 740 pre-selection instructions to the first driver in the FIFO list 540, then the second, etc., until the required number of pre-selection instructions have been sent. The method 700 is repeated for each time period (e.g., once a minute).

FIG. 8 illustrates a method 710 for predicting the demand for rides, according to one embodiment. In the embodiment shown in FIG. 8, the method 710 begins with the demand prediction module 510 producing 810 an initial estimate of demand for the next period based the historical demand in similar periods (as described above, with reference to FIG. 5).

The demand prediction module 510 receives 820 current demand data from one or more sources (e.g., passenger devices 220 and external data sources 230). For example, in one embodiment, the demand prediction module 510 receives 820 real-time data indicating predicted landing times for flights (either as specific times, or relative a scheduled arrival time). As another example, the demand prediction module 510 might receive an indication of the number of phones with a ride request app installed that were recently switched on within the airport. This number strongly correlates with the number of users of the system who have recently landed at the airport.

The demand prediction module 510 updates 830 the demand estimate based on the current demand data. In the example embodiment where real-time flight data is received 830, the demand prediction module 510 can increase the estimate of demand if one or more large planes have recently landed off schedule. Conversely, the demand estimate can be reduced if a typically busy flight that was scheduled to have landed recently is delayed and yet to arrive. Similarly, in the example involving the number of phones recently switched on, this number can be compared to the number of phones typically switched on in similar time periods. This indicates whether an unusually large or small number of potential passengers have recently landed at the airport, and the estimated demand is adjusted accordingly. The demand prediction module 510 then outputs 840 the updated estimate of demand as the predicted demand (e.g., for use in determining the number of drivers who should be pre-selected).

In other embodiments, the future demand for rides is predicted using a machine learning model that takes several signals as inputs. Each input signal is weighted and processed by the machine learning model to produce a predicted demand as output. The weight given to each signal is evolved over time based on the accuracy of the predictions. Thus, the prediction becomes more reliable over time, increasing the efficiency of the passenger transport system 200.

In some such embodiments, the input signals include the month, day of the week, time (e.g., to the nearest hour, half-hour, quarter-hour, minute, or the like), proximity to holidays, proximity to scheduled events (e.g., sporting events, conventions, public transit maintenance, etc.), flight arrival data, and the number of people opening the ride request app within the geographic area of the airport within a given time (e.g., the last minute, the last five minutes, etc.). Initially, the model gives greatest weight to signals that have known historical correlations (e.g., month, day, time, etc.) with demand. Over time, the weight given to signals with more direct but less well known correlations to demand (e.g., flight data, the number of people opening the ride share app, etc.) increases as the model learns the corresponding correlations. Thus, the predictions of demand can become more accurate over time as more data regarding the correlation between the various signals and demand is collected. In one embodiment, once the model has been active for a substantial period of time, the model puts significantly greater weight on the flight data signal (or signals) than others as this may provide the most direct measure of the number of people arriving at the airport.

FIG. 9 illustrates a method 730 for determining the number of drivers to pre-select from a waiting lot 120 to meet the predicted demand, according to one embodiment. In the embodiment shown in FIG. 9, the method 730 begins with the pre-selection module 520 receiving 910 the predicted unmet demand for the next period (e.g., from the demand prediction module 510). The predicted unmet demand indicates the number of ride requests that are expected for the time period that cannot be met by drivers that have already been pre-selected, or are otherwise in the vicinity of the terminal 110 (e.g., those who are about to or have just dropped off passengers).

A driver counter is set to zero and the method 730 enters a loop. In each iteration of the loop, the pre-selection module 520 determines 930 the probability that the next driver in the FIFO queue 540 will respond to a pre-selection instruction during the time period in question. The unmet demand is then reduced 940 based on this probability. In one embodiment, the unmet demand is reduced 940 by the probability. For example, if the probability is 90%, the demand is reduced by 0.9. In another embodiment, the probability that the driver will not respond in the next period but will eventually respond is also considered. For example, even though the probability of responding in the next period is 50%, if the probability of the driver responding eventually is 90%, the demand might be reduced by 0.7.

Once the unmet demand has been adjusted, the pre-selection module 520 checks whether the adjusted unmet demand is less than zero 950. If not, the driver counter is incremented by one 955, and another iteration of the loop begins. If the adjusted unmet demand is less than zero, the pre-selection module 520 outputs 960 the value of the driver counter (e.g., for that number of drivers to be issued pre-selection instructions). Note that because the driver counter is not incremented in the last iteration, the sum of probabilities for those drivers issued pre-selection instructions for the current period will typically be slightly less than the estimated unmet demand. If a more aggressive pre-selection strategy is preferable, the driver counter can be incremented for the last iteration as well, which typically results in the sum of response probabilities being slightly greater than the estimated unmet demand.

FIG. 10 illustrates a use case where a passenger requests a ride, which is provided by a previously pre-selected driver, according to one embodiment. In the embodiment shown in FIG. 10, the matching server 240 receives location data 1010 from a driver device 210. Based on the location data 1010, the matching server 240 determines that the driver has entered a waiting lot 120 at and airport, and adds the driver to the FIFO queue 540.

The matching server 240 receives passenger demand data 1020 and external demand data 1030 from passenger devices 220 (including passenger device 220A) and one or more external data sources 230, respectively. The passenger demand data 1020 are any data provided by passenger devices 1020 that are used either individually or after aggregation with such data received from other passenger devices 220 to predict demand (e.g., current location data, a notification that the device was switched on, etc.). Similarly, the external demand data 1030 are any data received from external data sources 230 used to predict demand (e.g., flight data, sporting event data, etc.).

The matching server 240 estimates the currently unmet demand (e.g., using the method of FIG. 8) and determines the number of pre-selection instructions to issue. The matching server 240 then sends pre-selection instructions 1040 to that number of driver devices 210, including driver device 210A. The driver corresponding to driver device 210A sees the pre-selection instruction on a display of the device and leaves the waiting lot 120 to head towards the terminal 110.

While the driver is en route to the terminal, a passenger requests a ride from the terminal 110 to a destination using an app on the passenger device 220A. The matching server 240 receives the ride request 1050. Based on location data 1060 received from the driver device 210A, the matching server 240 determines that the driver is en route to the terminal 110 and has the earliest ETA of the currently available drivers. Consequently, the matching server 240 sends a passenger assignment 1070 to the driver device 210A identifying the passenger and the destination. The matching server 240 also sends driver information 1080 to the passenger device 220A identifying the driver (e.g., name, photo, and make and model of vehicle).

The driver arrives in front of the terminal 110 sooner than if he or she had waited until receiving the passenger assignment 1070 before leaving the waiting lot 120. The passenger identifies the driver based on the driver information 1080 and gets into the driver's vehicle. The driver confirms that the passenger has been picked up (e.g., via manual input into the driver device 210A), and a pickup confirmation 1090 is sent to the matching server 240. Alternatively, the passenger may confirm pickup has occurred, or pickup may be confirmed automatically (e.g., based on location data).

The driver takes the passenger to the destination and confirms when it is reached (e.g., via manual input into the driver device 210A). The driver device 210A sends a drop off confirmation 1095 to the matching server 240. Alternatively, the passenger may confirm when the destination is reached, or drop off may be confirmed automatically (e.g., based on location data). The driver then receives remuneration for the service (e.g., calculated based on distance traveled or time in transit and automatically charged to the passenger's credit card). Thus, the use of pre-selection enables the matching server 240 to more efficiently perform its function of pairing passengers with appropriate drivers, reducing network overhead and improving the experience for drivers and passengers alike.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a passenger transportation system with pre-selection functionality. Thus, while particular embodiments and applications have been illustrated and described, the described subject matter is not limited to the precise construction and components disclosed. Rather, the scope of protection should be determined by the following claims.

We claim:

1. A computer-implemented method for arranging transport services, the method comprising:
   predicting a number of transport requests in a first geographic region during a future time period, the predicting including:
      receiving one or more signals regarding a current time, wherein the one or more signals include data indicating a number of recent instances of a ride request application being opened determined based on messages transmitted by client mobile devices of one or more riders responsive to the ride request application being initiated on the client mobile device; and
      applying a machine learning algorithm to the one or more signals to generate a prediction of the number of transport requests;
   estimating unmet demand based on the predicted number of transport requests, the estimating comprising subtracting, from the predicted number of transport requests, a number of driver mobile computing devices which have previously received transmitted messages instructing an associated receiving driver to travel towards a specified location for which the receiving driver is still available for assignment;
   receiving, from driver mobile computing devices over a computing network, data packets including GPS location data and availability data generated by the driver mobile computing devices, the GPS location data corresponding to positions of the driver mobile computing devices within or attached to driver vehicles at a current time;
   identifying a plurality of the driver mobile computing devices based on the received GPS location data, each driver mobile computing device of the plurality of the driver mobile computing devices currently positioned in a second geographic region designated as a waiting area for the first geographic region and having a state, determined from the availability data, indicating availability of a corresponding driver to provide transport services;
   determining a number of instances of a message to transmit to driver mobile computing devices, the message instructing a receiving driver to travel towards a specified location in the first geographic region, the number of instances determined based on the estimated unmet demand and a probability that, on receiving the message, the receiving driver will travel towards the specified location as instructed;
   selecting a first set of driver mobile computing devices from the plurality of the driver mobile computing devices to message, the number of driver mobile computing devices in the first set being equal to the determined number of instances of the message;
   transmitting, over the computing network to each driver mobile computing device of the first set of driver mobile computing devices, an instance of the message instructing the receiving driver to travel toward a specified location in the first geographic region without assigning a specific transport service or rider to the receiving driver; and
   during a later time period:
      receiving, from a client mobile device of a first rider, a transport request including a pickup location in the first geographic region;
      receiving, from a second set of driver mobile computing devices from the plurality of the driver mobile computing devices over the computing network, data packets including updated GPS location data and availability data generated by the second set of driver mobile computing devices, the second set of driver mobile computing devices including at least some of the first set of driver mobile computing devices;

determining a subset of driver mobile computing devices from the second set of driver mobile computing devices responsive to the updated GPS location data indicating the corresponding driver has left the second geographic region and has moved more than a threshold distance along a route to the pickup location;

selecting, from the subset of driver mobile computing devices, a first driver mobile computing device based at least in part on a distance between the first driver mobile computing device and the pickup location, as indicated by the updated GPS location data;

transmitting, to the first driver mobile computing device, an invitation to provide the transport service for the first rider;

receiving, from the first driver mobile computing device, an indication of acceptance of the invitation;

assigning, responsive to the indication of acceptance, a driver corresponding to the first driver mobile computing device to provide the transport service for the first rider; and transmitting a message to the first driver mobile computing device, the message causing the first driver mobile computing device to display a rider identity for the first rider, the pickup location, and a recommended route to the pickup location.

2. The method of claim 1, wherein the one or more signals further include an indication of a current time period, and the predicted number of transport requests is based on historical demand in time periods similar to the current time period.

3. The method of claim 2, wherein the current time period is at least one of: a current time of day, a current day of the week, a current month, or a current date, and the time periods similar to the current period of time include at least one of: a same time of day, a same day of the week, a same month, or a same date.

4. The method of claim 1, wherein the one or more signals further include at least one of: flight data, location data received from passenger devices, data indicating a number of passenger devices recently switched on, calendars corresponding to passenger devices, or user profiles corresponding to passenger devices.

5. The method of claim 1, wherein the second geographic region is a subset of the first geographic region.

6. The method of claim 1, wherein selecting the first driver mobile computing device based at least in part on the distance between the first driver mobile computing device and the pickup location comprises selecting a driver mobile computing device of the subset of driver mobile computing devices that has a shortest estimated time of arrival at the pickup location.

7. The method of claim 1, wherein each driver mobile computing device in a first-in-first-out list has an individual probability of the corresponding driver responding to a message instructing the receiving driver to travel towards the specified location, and determining the number of instances of the message to transmit includes summing the individual probabilities until the sum exceeds the estimated unmet demand.

8. The method of claim 1, further comprising determining that a driver is still available for assignment based on GPS location data corresponding to the driver indicating the driver is traveling toward the pickup location.

9. A non-transitory computer-readable storage medium storing executable computer program code for arranging transport services in a first geographic region, the computer program code comprising instructions for:

predicting a number of transport requests in a first geographic region during a future time period, the predicting including:
  receiving one or more signals regarding a current time, wherein the one or more signals include data indicating a number of recent instances of a ride request application being opened determined based on messages transmitted by client mobile devices of one or more riders responsive to the ride request application being initiated on the client mobile device; and
  applying a machine learning algorithm to the one or more signals to generate a prediction of the number of transport requests;

estimating unmet demand based on the predicted number of transport requests, the estimating comprising subtracting, from the predicted number of transport requests, a number of driver mobile computing devices which have previously received transmitted messages instructing an associated receiving driver to travel towards a specified location for which the receiving driver is still available for assignment;

receiving, from driver mobile computing devices over a computing network, data packets including GPS location data and availability data generated by the driver mobile computing devices, the GPS location data corresponding to positions of the driver mobile computing devices within or attached to driver vehicles at a current time;

identifying a plurality of the driver mobile computing devices based on the received GPS location data, each driver mobile computing device of the plurality of the driver mobile computing devices currently positioned in a second geographic region designated as a waiting area for the first geographic region and having a state, determined from the availability data, indicating availability of a corresponding driver to provide transport services;

determining a number of instances of a message to transmit to driver mobile computing devices, the message instructing a receiving driver to travel towards a specified location in the first geographic region, the number of instances determined based on the estimated unmet demand and a probability that, on receiving the message, the receiving driver will travel towards the specified location as instructed;

selecting a first set of driver mobile computing devices from the plurality of the driver mobile computing devices to message, the number of driver mobile computing devices in the first set being equal to the determined number of instances of the message;

transmitting, over the computing network to each driver mobile computing device of the first set of driver mobile computing devices, an instance of the message instructing the receiving driver to travel toward a specified location in the first geographic region without assigning a specific transport service or rider to the receiving driver; and during a later time period:
  receiving, from a client mobile device of a first rider, a transport request including a pickup location in the first geographic region;
  receiving, from a second set of driver mobile computing devices from the plurality of the driver mobile computing devices over the computing network, data packets including updated GPS location data and availability data generated by the second set of driver mobile computing devices, the second set of driver mobile computing devices including at least some of the first set of driver mobile computing devices;

determining a subset of driver mobile computing devices from the second set of driver mobile computing devices responsive to the updated GPS location data indicating the corresponding driver has left the second geographic region and has moved more than a threshold distance along a route to the pickup location;

selecting, from the subset of driver mobile computing devices, a first driver mobile computing device based at least in part on a distance between the first driver mobile computing device and the pickup location, as indicated by the updated GPS location data;

transmitting, to the first driver mobile computing device, an invitation to provide the transport service for the first rider;

receiving, from the first driver mobile computing device, an indication of acceptance of the invitation;

assigning, responsive to the indication of acceptance, a driver corresponding to the first driver mobile computing device to provide the transport service for the first rider; and transmitting a message to the first driver mobile computing device, the message causing the first driver mobile computing device to display a rider identity for the first rider, the pickup location, and a recommended route to the pickup location.

10. The non-transitory computer-readable storage medium of claim 9, wherein the one or more signals further include an indication of a current time period, and the predicted number of transport requests is based on historical demand in time periods similar to the current time period.

11. The non-transitory computer-readable storage medium of claim 10, wherein the current time period is at least one of: a current time of day, a current day of the week, a current month, or a current date, and the time periods similar to the current period of time include at least one of: a same time of day, a same day of the week, a same month, or a same date.

12. The non-transitory computer-readable storage medium of claim 9, wherein the one or more signals further include at least one of: flight data, location data received from passenger devices, data indicating a number of passenger devices recently switched on, calendars corresponding to passenger devices, or user profiles corresponding to passenger devices.

13. The non-transitory computer-readable storage medium of claim 9, wherein the second geographic region is a subset of the first geographic region.

14. The non-transitory computer-readable storage medium of claim 9, wherein the instructions for selecting the first driver mobile computing device based at least in part on the distance between the first driver mobile computing device and the pickup location comprise instructions for selecting a driver mobile computing device of the subset of driver mobile computing devices that has a shortest estimated time of arrival at the pickup location.

15. The non-transitory computer-readable storage medium of claim 9, wherein each driver mobile computing device in a first-in-first-out list has an individual probability of the receiving driver responding to a message instructing the corresponding driver to travel towards the specified location, and determining the number of instances of the message to transmit includes summing the individual probabilities until the sum exceeds the estimated unmet demand.

16. The non-transitory computer-readable storage medium of claim 9, wherein the instructions further comprise instructions for determining that a driver is still available for assignment based on GPS location data corresponding to the driver indicating the driver is traveling toward the pickup location.

17. A passenger transport system comprising:
a plurality of driver mobile computing devices, each driver mobile computing device located within or attached to a corresponding vehicle that is available to provide transport services, each driver mobile computing device including a display for presenting instructions to a driver; and
a matching server in communication with the plurality of driver mobile computing devices and the plurality of passenger devices over a computing network, the matching server configured to:
predict a number of transport requests in a first geographic region during a future time period, the predicting including:
receiving one or more signals regarding a current time, wherein the one or more signals include data indicating a number of recent instances of a ride request application being opened determined based on messages transmitted by client mobile devices of one or more riders responsive to the ride request application being initiated on the client mobile device; and
applying a machine learning algorithm to the one or more signals to generate a prediction of the number of transport requests;
estimate unmet demand based on the predicted number of transport requests, the estimating comprising subtracting, from the predicted number of transport requests, a number of driver mobile computing devices which have previously received transmitted messages instructing an associated receiving driver to travel towards a specified location for which the receiving driver is still available for assignment;
receive, from driver mobile computing devices over the computing network, data packets including GPS location data and availability data generated by the driver mobile computing devices, the GPS location data corresponding to positions of the driver mobile computing devices within or attached to driver vehicles at a current time;
identify a plurality of driver mobile computing devices based on the received GPS location data, each driver mobile computing device of the plurality of driver mobile computing devices currently positioned in a second geographic region designated as a waiting area for the first geographic region and having a state, determined from the availability data, indicating availability of a corresponding driver to provide transport services;
determine a number of instances of a message to transmit to driver mobile computing devices, the message instructing a receiving driver to travel towards a specified location in the first geographic region, the number of instances determined based on the estimated unmet demand and a probability that, on receiving the message, the receiving driver will travel towards the specified location as instructed;

select a first set of driver mobile computing devices from the plurality of the driver mobile computing devices to message, the number of driver mobile computing devices in the first set being equal to the determined number of instances of the message; and transmit, over the computing network to each driver mobile computing device of the first set of driver mobile computing devices, an instance of the message instructing the receiving driver to travel toward a specified location in the first geographic region without assigning a specific transport service or rider to the receiving driver.

18. The passenger transport system of claim 17, wherein the matching server is further configured to:

during a later the given period of time:

receive, from a client mobile device of a first rider, a transport request including a pickup location in the first geographic region;

receive, from a second set of driver mobile computing devices from the plurality of the driver mobile computing devices over the computing network, data packets including updated GPS location data and availability data generated by the second set of driver mobile computing devices, the second set of driver mobile computing devices including at least some of the first set of driver mobile computing devices;

determine a subset of driver mobile computing devices from the second set of driver mobile computing devices responsive to the updated GPS location data indicating the corresponding driver has left the second geographic region and has moved more than a threshold distance along a route to the pickup location;

select, from the subset of driver mobile computing devices, a first driver mobile computing device based at least in part on a distance between the first driver mobile computing device and the pickup location, as indicated by the updated GPS location data;

transmit, to the first driver mobile computing device, an invitation to provide the transport service for the first rider;

receive, from the first driver mobile computing device, an indication of acceptance of the invitation;

assign, responsive to the indication of acceptance, a driver corresponding to the first driver mobile computing device to provide the transport service for the first rider; and transmit a message to the first driver mobile computing device, the message causing the first driver mobile computing device to display a rider identity for the first rider, the pickup location, and a recommended route to the pickup location.

19. The method of claim 1, wherein determining a subset of driver mobile computing devices from the second set of driver mobile computing devices is further responsive to the updated GPS location data indicating that the corresponding driver is on a road that is part of a reasonable route to the pickup location, the reasonable route being a primary route or one of a set of secondary routes generated by a routing algorithm.

* * * * *